United States Patent [19]

Arora et al.

[11] Patent Number: 5,832,260
[45] Date of Patent: Nov. 3, 1998

[54] PROCESSOR MICROARCHITECTURE FOR EFFICIENT PROCESSING OF INSTRUCTIONS IN A PROGRAM INCLUDING A CONDITIONAL PROGRAM FLOW CONTROL INSTRUCTION

[75] Inventors: Judge K. Arora, Cupertino; Gary N. Hammond, Campbell; Harshvardhan P. Sharangpani, Santa Clara, all of Calif.

[73] Assignee: Intel Corporation, Santa Clara, Calif.

[21] Appl. No.: 581,031

[22] Filed: Dec. 29, 1995

[51] Int. Cl.⁶ .................................................. G06F 9/40
[52] U.S. Cl. ............................................................ 395/586
[58] Field of Search ..................... 364/DIG. 1, DIG. 2; 395/580, 581, 583, 584, 585, 586, 587, 588, 589, 590, 591, 582

[56] References Cited

U.S. PATENT DOCUMENTS 5,434,985   7/1995   Emma et al. ............................. 395/375
5,511,172   4/1996   Kimura et al. .......................... 395/582
5,634,103   5/1997   Dietz et al. .............................. 395/582

OTHER PUBLICATIONS

Gulati, et al.; "Performance Study of a Multithreaded Superscalar Microprocessor"; 1996 *IEEE*; pp. 291–301.
Popescu, et al.; "The Metaflow Architecture"; 1991 *IEEE*; pp. 10–13 and 63–73.
Chang, et al.; "The Importance of Prepass Code Scheduling for Superscalar and Superpipelined Processors"; 1995 *IEEE*; 353–370.
Pnevmatikatos, et al.; "Control Flow Prediction for Dynamic ILP Processors"; 1993 *IEEE*; pp. 153–163.
Uht, et al.; "Disjoint Eager Execution: An Optimal Form of Speculative Execution"; 1995 *IEEE*; pp. 313–325.
Pnevmatikatos, et al.; "Guarded Execution and Branch Prediction in Dynamic ILP Processors"; *21th International Symposium on Computer Architecture, 1994*; 10 pages.
Mike Johnson; "Superscaler Microprocessor Design"; 1991 by Prentice–Hall, Inc., 288 pgs.

*Primary Examiner*—Robert B. Harrell
*Attorney, Agent, or Firm*—Cynthia Thomas Faatz

[57] ABSTRACT

A processor microarchitecture for efficient processing of instructions in a program including a program flow control instruction. The program flow control instruction specifies a target instruction and includes one or more candidate instructions between the target instruction and the program flow control instruction. A fetch unit fetches instructions in the program from the memory. Control logic stores one or more candidate instructions in the buffer prior to resolution of the conditional program flow control instruction in response to the fetch unit fetching a program flow control instruction specifying a target instruction within a predetermined number of instructions from the conditional program flow control instruction. In another embodiment, the candidate instructions are stored only if the conditional branch instruction is considered to be difficult to predict. The execution unit of the invention executes the candidate instructions if the conditional program flow control instruction is resolved to be not taken and ignores the candidate instructions, through no-ops in one embodiment, if the conditional program flow control instruction is resolved to be taken, thus avoiding a misprediction penalty.

36 Claims, 7 Drawing Sheets

PROCESSOR MICROARCHITECTURE FOR EFFICIENT PROCESSING OF INSTRUCTIONS IN A PROGRAM INCLUDING A CONDITIONAL PROGRAM FLOW CONTROL INSTRUCTION

BACKGROUND OF THE INVENTION

1. Field of the Invention

The invention relates to the field of computer systems. Specifically, the invention relates to a processor microarchitecture for efficient processing of an instruction stream which includes a conditional program flow control instruction.

2. Description of Related Art

Microprocessor designers and manufacturers continue to focus on ways to improve microprocessor instruction execution efficiency and speed. The design of the processor, particularly the instruction execution core, is critical to processor and overall computer system performance.

Many microprocessors use instruction pipelining as one way to increase instruction throughput, sometimes using very deep instruction pipelines including many pipeline stages and substages. Another approach to improving instruction execution speed is called "out-of-order" execution. In a microprocessor providing for out-of-order execution, instructions may be executed out of program order to take advantage of instruction parallelism. Instruction pipelining and out-of-order execution techniques may be used separately or together in the same microprocessor.

The fetch unit of a processor fetches instructions from memory according to a program flow which may be controlled by a program counter in some computer systems. In such computer systems, for example, the program counter is generally incremented to fetch instructions sequentially. Certain instructions or conditions, however, can change the program flow such that instructions are fetched non-sequentially or from a different basic program block. Interrupts and program exceptions are examples of conditions that may alter the sequential program flow to execute specialized routines depending on the interrupt or exception that occurs.

Another way to change the program flow is through a program flow control instruction such as a branch instruction. There are many different types of branch instructions to address different program flow control requirements. For example, most instruction set architectures include both conditional and unconditional branch instructions. A conditional branch instruction, as its name suggests, specifies a condition such that the program flow is redirected to a non-sequential target instruction only if the condition is met. If the condition is met, the branch instruction is then to be resolved to be taken. Similarly, if the condition is not met, the branch instruction is resolved to be not taken.

The target instruction referred to above, is the instruction to which the program flow branches if the branch instruction is resolved to be taken. Branch instructions can specify a target instruction in various ways including indirectly by specifying a register which contains the address of a target instruction, or directly by including the address of the target instruction within the branch instruction itself. A branch instruction may also specify the target instruction in terms of an offset to be added to the instruction pointer (IP), in computer systems which use an instruction pointer, and is referred to as an IP-relative branch instruction. Further, branch instructions may direct the program flow to a nearby target instruction (only a few instructions away from the branch instruction) or to a target instruction many instructions away, or even within a different basic program block.

In a microprocessor having a pipelined architecture, instruction throughput is most efficient when the pipeline or pipelines are kept "full". In other words, it is most advantageous to have instructions being processed at every pipeline stage in each processor clock cycle. To keep an instruction pipeline full, instructions must generally be fetched continuously. Often an instruction pipeline is many pipeline stages deep such that instructions are fetched several clock cycles before they are executed. This can be an issue where the instruction fetched is a program flow control instruction such as a conditional branch instruction.

Conditional branch instructions often rely on data from other instructions for resolution of the condition specified within the instruction. If an instruction affecting the resolution of the condition has not been executed at the time the conditional branch instruction is fetched, the processor does not have the information necessary to resolve the branch instruction. If the branch instruction cannot be resolved because the necessary data is not available, the processor does not know how to direct the program flow and therefore, which instructions are the correct instructions to fetch next.

If the branch instruction is resolved to be taken, the target instruction and instructions sequentially following the target instruction, referred to herein as the target instruction stream, must be fetched. If the branch instruction is resolved to be not taken, instructions sequentially following the branch instruction must be fetched. Thus, the program flow depends on resolution of the branch instruction. Where the branch instruction cannot be resolved at the time it is fetched because the required data is not available, there can be an issue.

Some processors address this issue by using some form of branch prediction logic. Although the use of branch prediction logic can help to improve microprocessor performance, it is virtually impossible to accurately predict the resolution of a branch instruction every time regardless of the branch prediction scheme used. Mispredictions by the branch prediction logic can have a significant impact on microprocessor performance. The microprocessor relies on the branch prediction logic to determine whether to fetch instructions from the sequential instruction stream following the conditional branch instruction or the target instruction stream. A misprediction means that the wrong instructions are being processed in the microprocessor pipeline.

When a misprediction is identified, the processor instruction pipeline is usually "flushed". Thus, instructions in the microprocessor at various phases of execution are cleared from the pipeline and instructions from the correct instruction stream, and thus the correct program flow, must be fetched. Instructions flushed from the pipeline create "bubbles" in the pipeline such that several clock cycles may be required before the next instruction completes execution. Thus, instruction throughput and overall microprocessor performance is compromised.

Branch instructions are prevalent in today's software application code. Thus, the cumulative misprediction penalty on microprocessor performance can be significant. Improved branch prediction through more detailed branch history and other similar approaches can help reduce the number of mispredictions, but the impact of a misprediction is still an issue.

A "short forward" branch instruction is an example of a frequently used program flow control instruction. FIG. 1 illustrates an example of a short forward branch instruction (Instruction 102). The short forward branch instruction 102 is a conditional branch instruction and thus, includes a condition 112, "If A>B". The short forward branch instruction 102 is an "IP-relative" branch instruction in this example, and thus, specifies the target instruction in terms of the instruction pointer (IP) plus an offset 113, "+4".

The target instruction specified by the short forward branch instruction 102 in this example, is an instruction 106. The target instruction is determined by adding the offset 113, to the current value of the instruction pointer. The IP is pointing to the branch instruction 102 when the target instruction is determined. Adding the offset 113, "+4" to the instruction 102 directs the program flow to the instruction 106 if the branch instruction is resolved to be taken.

The instructions 103–105 between the branch instruction and the target instruction are referred to herein as "candidate" instructions 114. The candidate instructions 114 as a group are alternately referred to herein as the "candidate instruction stream". The candidate instructions 114 are in the correct program flow if the branch instruction is resolved to be not taken. The target instruction stream includes the target instruction 106 and the instruction 107 through the instruction n sequentially following the target instruction 106. Instructions within the target instruction stream are referred to herein as "normal" or target instructions. The particular operations indicated by the instructions in FIG. 1, i.e. ADD, MUL, etc., are for purposes of illustration only. Other operations can be used in a similar manner. Also, the target instruction may be a greater or fewer number of instructions away from the branch instruction such that there is a larger or smaller number of candidate instructions.

One approach addresses the misprediction penalty associated with short forward-type branch instructions using a method called predication, also referred to as guarding. Predication is actually used in lieu of short forward branch instructions in this approach. Instructions equivalent to candidate instructions 114 in FIG. 1 are written to a special "predicate" register along with a predicate associated with that instruction. The predicate specifies a condition that determines whether or not the instruction will be executed. Once the condition is resolved, the predicated instructions are executed and the architectural state of the processor is updated appropriately.

Although predication removes the misprediction penalty associated with short forward branch instructions, there are problems with this approach. The predicate register is visible to the instruction set architecture such that existing software must be recompiled or rewritten to take advantage of predication. Additionally, processor instruction encoding must be altered to provide for the predicate. This involves changes to the processor instruction set architecture and thus, can also affect existing software code.

Thus, it is desirable to be able to eliminate the misprediction penalty associated with processing particular types of program flow control instructions without altering the instruction set architecture. In this manner, existing software code can benefit from improved microprocessor performance without the need to be recompiled or rewritten.

SUMMARY OF THE INVENTION

A processor microarchitecture for efficient processing of instructions in a program including a program flow control instruction is described. The program flow control instruction specifies a target instruction and includes one or more candidate instructions between the target instruction and the program flow control instruction. The processor of the invention includes a fetch unit for fetching instructions in the program from the memory and a buffer coupled to the fetch unit. The processor of the invention also includes control logic for storing one or more candidate instructions in the buffer prior to resolution of the conditional program flow control instruction in response to the fetch unit fetching a program flow control instruction specifying a target instruction within a predetermined number of instructions from the conditional program flow control instruction. In another embodiment, the candidate instructions are stored only if the conditional branch instruction is considered to be difficult to predict. The execution unit of the invention executes the candidate instructions if the conditional program flow control instruction is resolved to be not taken and ignores the candidate instructions, through no-ops in one embodiment, if the conditional program flow control instruction is resolved to be taken.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are for explanation and understanding only.

DETAILED DESCRIPTION OF THE INVENTION

A processor microarchitecture for efficient processing of instruction streams including a conditional program flow control instruction is described. In the following description, numerous specific details are set forth, such as specific functional blocks, instruction formats, processing methods, etc., in order to provide a thorough understanding of the invention. However, it will be appreciated by one skilled in the art that the invention may be practiced without these specific details. In other instances, well-known structures, circuit blocks, interfaces and architectural functions have not been described in detail in order to avoid obscuring the invention.

Overview of the Computer System of the Invention

Figure 1:
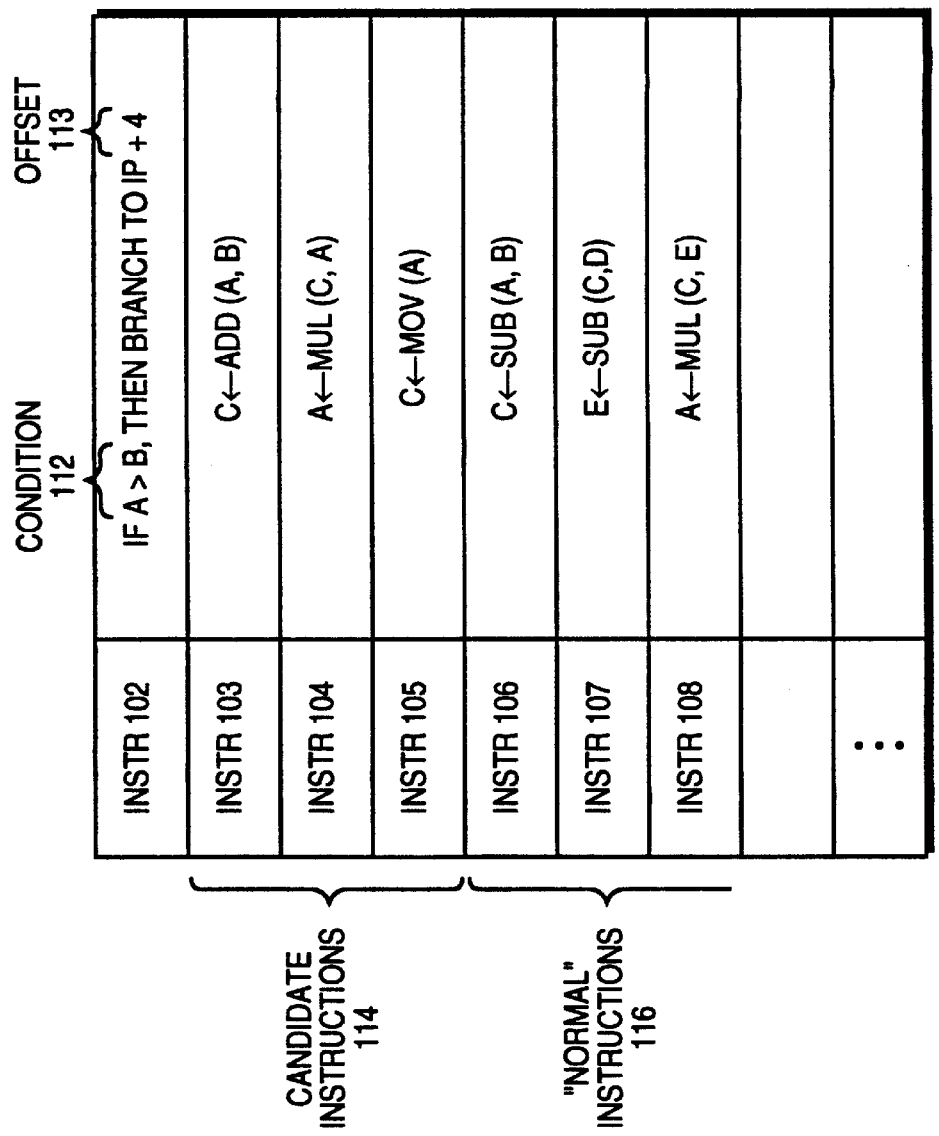
FIG. 1 illustrates an example of a program flow control instruction referred to as a short forward branch instruction in some instruction set architectures.
Figure 2:
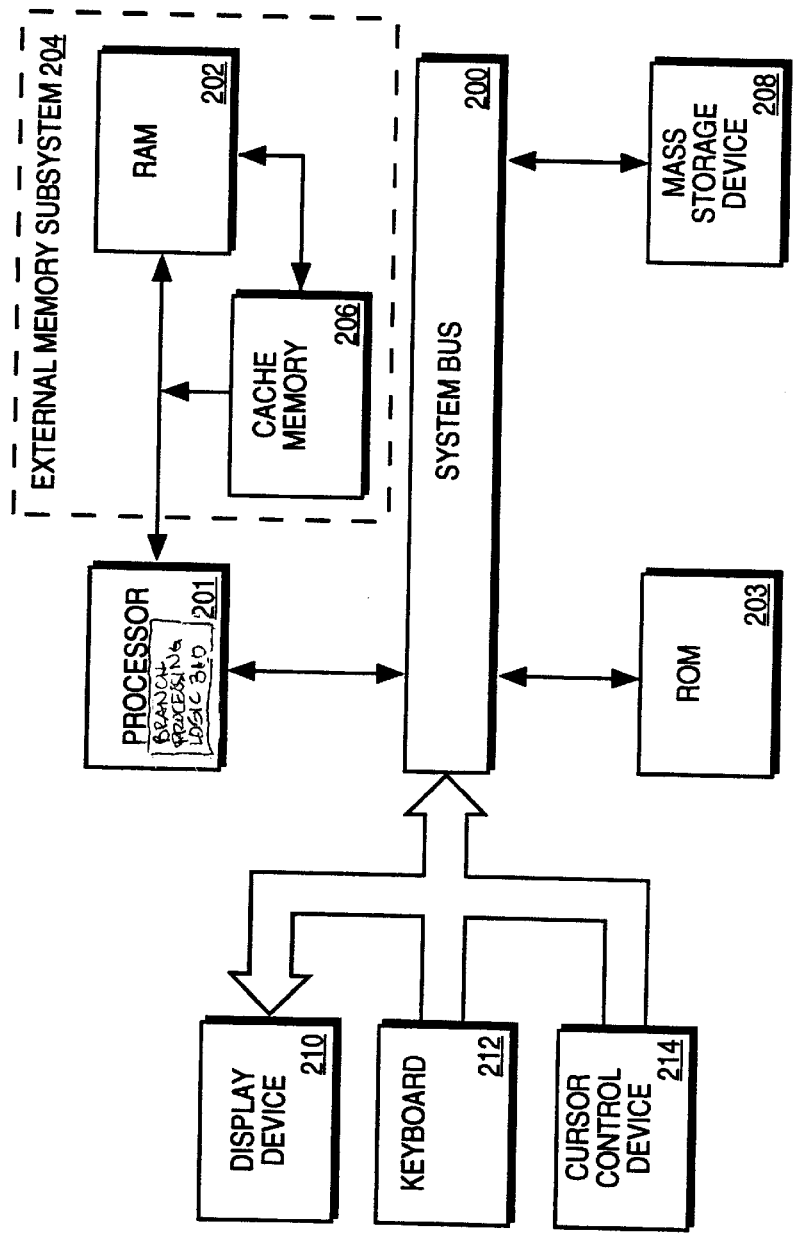
FIG. 2 is a block diagram of the computer system of one embodiment of the invention.

Referring to FIG. 2, a computer system in accordance with one embodiment of the invention is illustrated. The computer system of the invention comprises a system bus 200 for communicating information, a processor 201 coupled to the bus 200 for processing information, a random access memory (RAM) 202, also referred to as system memory or main memory, coupled to the processor 201 for storing information and instructions for the processor 201, and a read only memory (ROM) 203 or other non-volatile storage device coupled to the bus 200 for storing fixed information and instructions for the processor 201. The processor 201 includes branch processing logic 310 providing for efficient processing of instructions in a program flow including a short forward branch instruction or other similar program flow control instruction. The operation of the branch processing logic 310 is described in more detail below with reference to FIGS. 3–7. The computer system of the invention also includes an external cache memory 206 for storing frequently and recently used information for the processor 201. The cache memory 206 may be configured within the same integrated device package as the processor 201 or in a separate device package. Devices within the dotted line defining box 204 are referred to together as the external memory subsystem 204 which may also include additional devices not illustrated in FIG. 2.

Other components such as a mass storage device 208, a display device 210 such as a printer or monitor, a keyboard 212 or other input device and a cursor control 214 may also be included in the computer system of the invention.

In one embodiment of the invention, processor 201 is an Intel® Architecture Microprocessor such as is manufactured by Intel Corporation of Santa Clara, Calif., the corporate assignee of the invention. Other processor architectures may also be used in accordance with the invention.

It will be appreciated by those skilled in the art that other computer systems may be used with the invention. Similarly, it will be appreciated by those skilled in the art that the computer system illustrated in FIG. 2 may include additional components not illustrated in FIG. 2 or may be configured without components that are illustrated in FIG. 2.

Processor Architecture of the Invention

Figure 3:
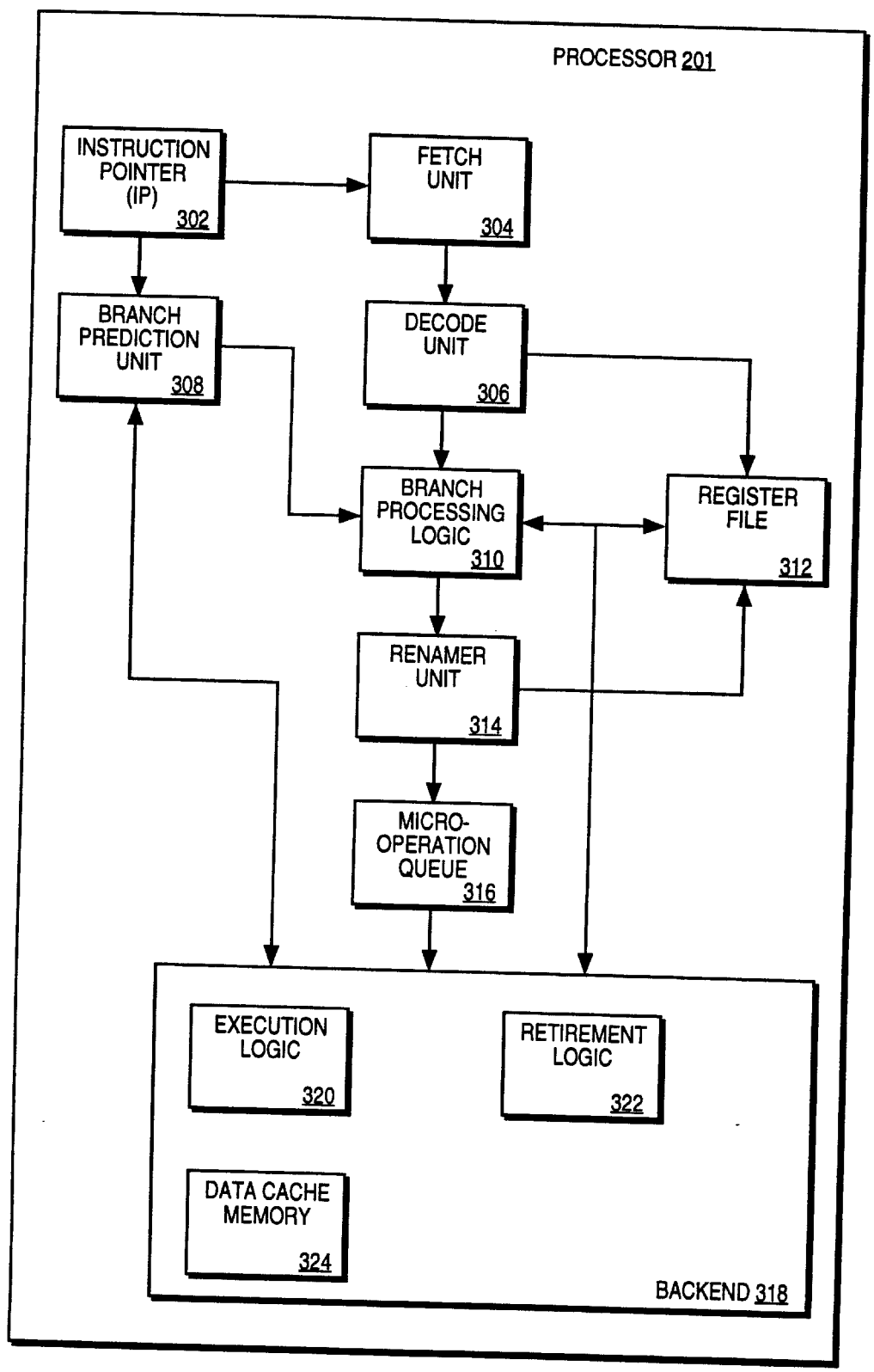
FIG. 3 is a block diagram of the processor of one embodiment of the invention.

Referring now to FIG. 3, an overview of the organization of processor 201 of one embodiment of the invention is illustrated. An instruction pointer 302 indicates the current location of the instruction in the program that is being executed in one embodiment. Other embodiments do not use an instruction pointer but control the program flow in another manner. The instruction pointer 302 is delivered in parallel to a fetch unit 304 and a branch prediction unit 308. The instruction pointer 302 directs the fetch unit 304 to fetch a particular instruction from memory.

In one embodiment, if a conditional program flow control instruction is fetched, the branch prediction unit 308 uses the instruction pointer 302 to determine whether the particular conditional program flow control instruction is predicted to be taken or not taken. In other embodiments, an instruction pointer is not used and the predicted outcome of the branch instruction is referenced in another manner. In one embodiment, the branch prediction unit 308 also stores information indicating whether a particular branch instruction at a particular program location is considered to be difficult to predict. A branch instruction may be considered to be difficult to predict based on branch history information stored in the branch prediction unit 308 or a variety of other approaches. For example, the branch prediction unit 308 may indicate that a particular instruction is difficult to predict if the instruction has been mispredicted a certain percentage of times that the branch instruction has been encountered. The particular percentage of mispredictions, also referred to herein as the misprediction rate, indicating that an instruction is difficult to predict can be varied according to the particular requirements of the system. In some circumstances, it may be desirable to identify a particular instruction as being difficult to predict if there has been even one prior misprediction. In other designs, it may be desirable to identify as difficult to predict, only those instructions that have been mispredicted a predetermined percentage of the times they have been encountered. Further, in some cases, the processor may dynamically determine which scheme to use or may use a combination of schemes to identify a branch instruction as being difficult to predict.

A branch instruction might also be considered to be difficult to predict if it has never been encountered before and thus, there is no branch history information available. Other factors which may be considered in making this determination are the condition being tested and the magnitude of the offset, in other words, how far away the target instruction is from the branch instruction. The branch prediction unit 308 may not be included in alternate embodiments of processor 201.

One embodiment of the invention includes a decode unit 306 coupled to fetch unit 304 for decoding fetched instructions into microinstructions that are easier for processor 201 to operate on in one embodiment. In other embodiments, a decode unit is not included and microinstructions are not used. In embodiments including the decode unit, microinstructions from the decode unit 306 are then evaluated by branch processing logic 310. The operation and organization of the branch processing logic 310 is described in more detail below with reference to FIG. 4.

A register renamer unit 314 coupled to the branch processing logic 310 and a register file 312 renames and allocates registers where required in one embodiment of the invention. Register renaming is an approach often used in processors providing for out-of-order instruction execution. The register renamer unit 314 essentially provides a holding space for speculative results and a mapping feature to be able to access these results, often based on some aspect of the instruction such as the physical destination (pdst) in one embodiment. A renamer unit 314 may not be included in alternate embodiments of the invention.

A micro-operation queue 316 is coupled to the renamer unit 314 in one embodiment. The micro-operation queue 316 dispatches instructions to the backend 318 for further processing. The micro-operation queue 316 may include a reservation station or other dispatch logic not shown in FIG. 3. The backend 318 in one embodiment of the invention includes execution logic 320, a data cache memory 324 for storing data for processor 201 and retirement logic 322. The execution logic 320 executes instructions fetched by the microprocessor and the retirement logic 322 retires instructions in program order to the register file 312 to commit the state of the processor to architectural state.

Thus, in one embodiment, instructions processed by the processor 201 of the invention go through a basic instruction processing flow including instruction fetch, decode in some embodiments, execution, and retirement.

Alternate embodiments of the invention may include other functional units not shown in FIG. 3 or may not include functional units that are illustrated in FIG. 3.

Branch Processing Logic of the Invention

Figure 4:
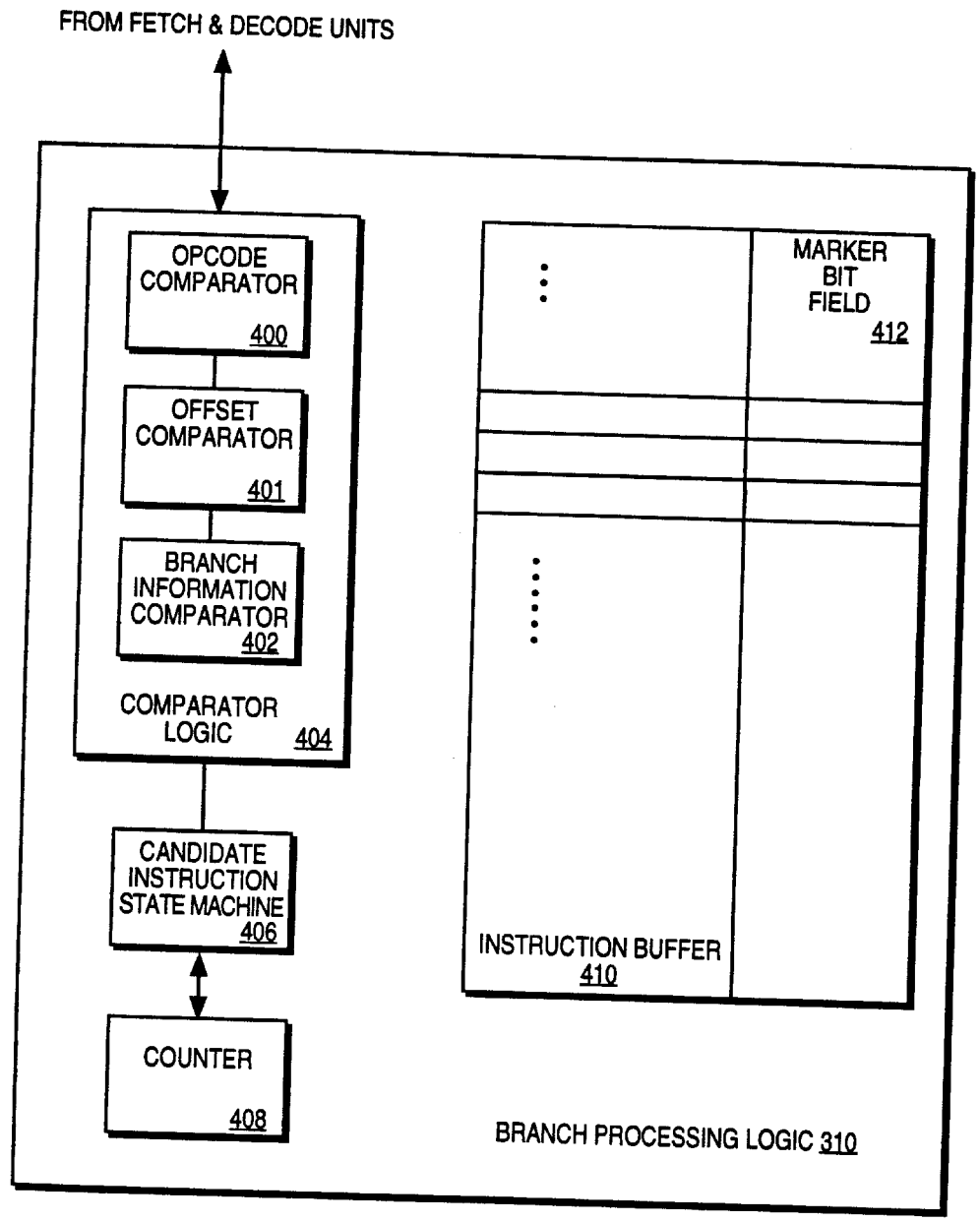
FIG. 4 is a block diagram of the branch processing logic of one embodiment of the invention.

Referring now to FIG. 4, the branch processing logic 310 of one embodiment of the invention is described in more detail. A branch instruction is used herein to illustrate the operation of the invention however, other program flow control instructions are also considered to be within the scope of the invention.

The branch processing logic 310 processes instructions decoded by the decode unit 306 in FIG. 3 in one embodiment to determine whether the program flow control optimization of the invention should be applied. Also, once it is determined that the program flow control optimization of the invention will be applied, the branch processing logic 310 helps to manage processing of instructions as required. In one embodiment, the program flow control optimization of the invention fetches candidate instructions before a conditional branch instruction or other program flow control instruction is resolved as described herein. The candidate instructions are then stored in a buffer until the conditional branch instruction is resolved. Once the branch instruction is resolved, the candidate instructions are immediately available for execution if the branch instruction is resolved not to be taken. If the branch instruction is resolved to be taken, the candidate instructions are ignored through register to register moves or another similar approach. In this manner, the optimization of the invention enables the program flow to continue when encountering a branch instruction such as a short forward branch instruction without incurring a misprediction penalty if it is determined that the candidate instructions are not to be executed. While the candidate instructions are held in the buffer awaiting resolution of the program flow instruction, other non-dependent instructions can continue through the processing flow.

The branch processing logic 310 includes comparator logic 404, a candidate instruction state machine 406, a counter 408, and an instruction buffer 410. In one embodiment, the comparator logic 404 includes opcode determination logic 400 which determines whether the decoded instruction is a conditional branch instruction. If not, the instruction is executed and retired in a normal manner without further processing by the branch processing logic 310. In an alternate embodiment, the opcode determination logic 400 is included in another functional unit of the processor such that instructions are only evaluated by the branch processing logic 310 after it is determined that the instruction is a conditional branch instruction. This may be the case, for example, in a system in which a branch target buffer supplies the opcode information.

After the opcode determination logic 400 determines that an instruction is a conditional branch instruction, in one embodiment, comparator logic 404 further analyzes the instruction to determine whether the program flow control optimization of the invention should be applied. In one embodiment of the invention, the comparator logic 404 includes an offset comparator 401 which determines whether the target instruction specified by the branch instruction is less than a predetermined number of instructions away from the branch instruction. In one embodiment, the branch instruction is an IP-relative branch instruction such that the target instruction is specified in terms of the instruction pointer value plus an offset. In this case, the offset comparator 401 simply compares the offset to the predetermined number. In other embodiments, the target instruction is specified by its address, and the offset comparator 401 determines whether the difference between the address and the instruction pointer is less than the predetermined number. In still other embodiments, the offset information may be supplied by a branch target buffer. In the case of an indirect branch instruction, one embodiment of the offset comparator 401 compares the value in the register indicated by the branch instruction to the instruction pointer to determine the distance between the branch instruction and the target instruction.

The predetermined number discussed above is alternately referred to herein as the maximum offset. Determination of the maximum offset can be based on a variety of considerations. In one embodiment, the maximum offset is determined by analyzing a typical program flow. In this case, the maximum offset could be equal to the average number of instructions between program flow control instructions. In this manner, using a branch instruction as an example, it is less likely that another branch instruction will be encountered between the branch instruction being evaluated and its target instruction. Other factors are used to determine the maximum offset in other embodiments of the invention.

Further, in one embodiment of the invention, the maximum offset is fixed for all programs or software applications. In alternate embodiments of the invention, the maximum offset can be adjusted depending on the type of software application being executed by the processor 201. For example, the processor may dynamically decrease the offset if branches are being predicted poorly or with an accuracy below a predetermined target.

In one embodiment of the invention, the comparator logic 404 also includes a branch information comparator 402. The branch information comparator 402 uses information provided by the branch prediction unit 308 in FIG. 3 to determine whether the program flow optimization of the invention should be applied. In one embodiment, the optimization of the invention is applied only if the branch instruction that is being processed is considered to be "difficult to predict" as indicated by the branch prediction unit 308. In alternate embodiments of the invention, the branch information comparator 402 may not be included.

Thus, in one embodiment, the comparator logic 404 determines that the program flow control optimization of the invention will be applied if a conditional branch instruction is encountered and the target instruction specified is less than a predetermined number of instructions away. In another embodiment, the program flow control optimization of the invention is applied if the conditional branch instruction is considered to be difficult to predict. In an alternate embodiment, the program flow control optimization of the invention is applied only if a difficult to predict conditional branch instruction with a nearby target instruction (the target instruction is separated from the branch instruction by less than the maximum offset) is encountered. In still another embodiment, the program flow control optimization of the invention may be applied for all conditional branch operations.

If the conditional branch instruction of the invention is evaluated by the comparator logic 404 and does not meet the desired requirements of a particular embodiment, the optimization of the invention will not be applied. If the optimization of the invention is not applied, the instruction will be continue through a normal instruction processing flow which may still include branch prediction. In this case, in one embodiment, the branch prediction unit 308 (FIG. 3) will determine which instructions are fetched next for processing.

If however, the comparator logic 404 determines that the program flow control optimization of the invention will be applied, the branch processing logic 310 of the invention directs the processor 201 to fetch instructions from both the candidate instruction stream and the target instruction stream, or in-line such that the target instructions are fetched after the candidate instructions.

In one embodiment, candidate instructions are fetched first by the fetch unit 304 (FIG. 3) in cooperation with the candidate instruction state machine 406 and a counter 408. The candidate instruction state machine 406 and the counter 408 operate together to keep track of whether instructions being fetched are candidate instructions or instructions from the target instruction stream. The candidate instruction state machine 406 and its operation in cooperation with the counter 408 is described in more detail below with reference to FIG. 5. Once fetched, in one embodiment, both candidate instructions and instructions from the target instruction stream are stored in an instruction buffer 410. The instruction buffer 410 may be a dedicated buffer in one embodiment. In alternate embodiments, the instruction buffer 410 may be part of a reservation station or other logic that is also used for other purposes.

As a candidate instruction is stored in the instruction buffer 410, one or more bits in a marker bit field 412 of the instruction buffer 410 is set to indicate that the instruction is a candidate instruction. In one embodiment, a candidate instruction is indicated by setting a bit in marker bit field 412 to a "1". In this way, candidate instructions are identified as "special" instructions for later processing. The instructions are marked in cooperation with the candidate instruction state machine 406 and the counter 408 as described below.

If another branch instruction is encountered in the candidate instruction stream, in one embodiment, processing of the candidate instruction stream can be delayed pending the resolution of the conditional branch instruction. In another embodiment, the processor of the invention provides for additional branching such that the instruction stream can be recursively forked into two new candidate instruction streams. Multiple bits in the market bit field 412 are then used to identify instructions as candidate instructions. In this case, if the processor doesn't have sufficient resources to continue branching, or multiple branches are not provided for, processing of the candidate instruction stream is stalled until resolution of the conditional branch instruction.

Figure 5:
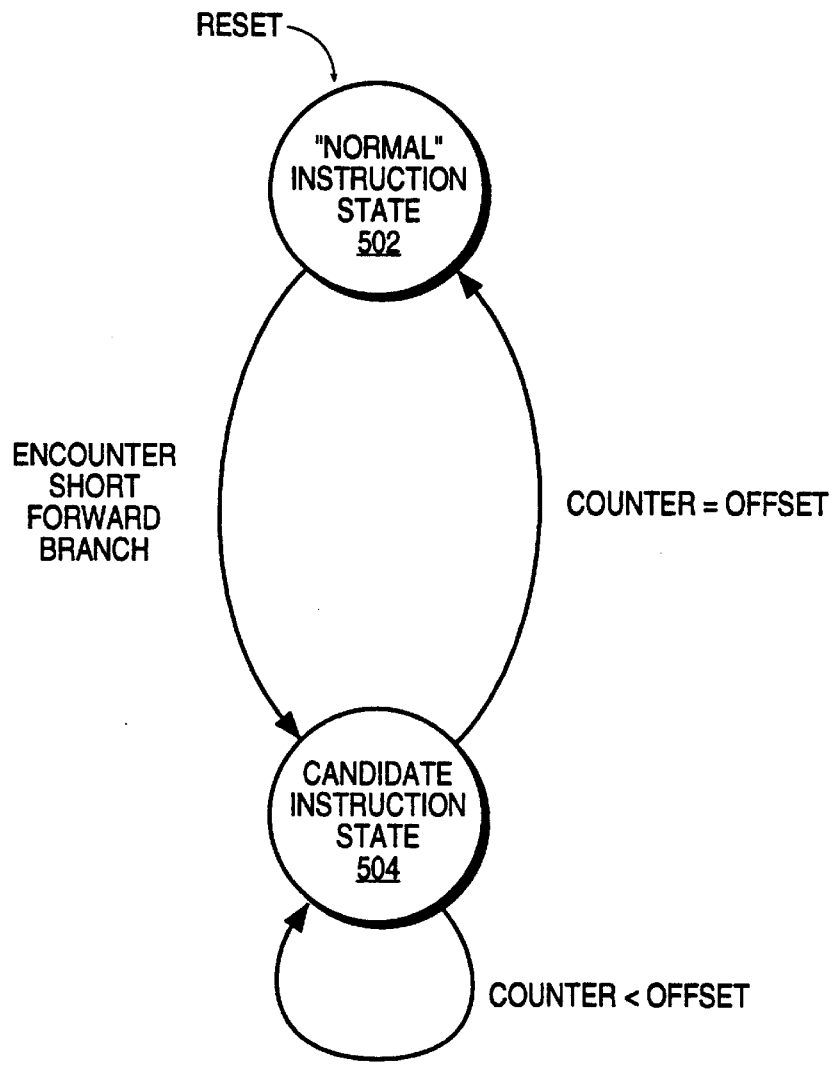
FIG. 5 is a state diagram illustrating the states of the candidate instruction state machine of one embodiment of the invention.

Referring now to FIGS. 4 and 5, the candidate instruction state machine 406 and its operation in cooperation with the counter 408 are described in more detail. The candidate instruction state machine 406 starts in a "normal" instruction state 502 indicating that instructions in a known program flow are being fetched. When a conditional branch instruction is encountered and it is determined by the comparator logic 404 that the program flow control optimization of the invention will be applied, the candidate instruction state machine 406 moves to a "candidate" instruction state 504.

In the candidate instruction state 504, candidate instructions are stored in the instruction buffer 410 and marked as candidate instructions by setting one or more bits in marker bit field 412. When the processor 201 enters the candidate instruction state 504, the counter 408 is incremented. If the counter is less than the offset indicated by the target instruction, a candidate instruction is fetched, stored in the instruction buffer 410 and marked as a candidate instruction by setting one or more bits in marker bit field 412. The processor 201 of the invention continues in this manner in the candidate instruction state 504 until the counter 408 is incremented to equal the offset as determined by the offset comparator 401 in FIG. 4, thereby indicating that all candidate instructions have been fetched. When the counter 408 reaches the number indicated by the offset, the candidate instruction state machine 406 transitions back to a normal instruction state 502 and the counter is reset. Thus, the candidate instruction state machine 406 and the counter 408 help to control fetching, temporary storage, and marking of candidate instructions as they are fetched.

Execution and Retirement Logic of the Invention

Referring back to FIG. 3, after the branch processing logic 310 determines that the program flow control optimization of the invention should be applied, and candidate instructions are fetched, stored, and marked, further processing of the conditional branch instruction and candidate instructions is completed by other functional units in the processor 201.

In one embodiment, the candidate instructions are held in the instruction buffer 410 until the corresponding branch instruction is resolved. When the branch instruction is resolved, the candidate instructions are executed by the execution logic 320 as described above if the conditional branch instruction is resolved to be not taken. Alternatively, if the conditional branch instruction is resolved to be taken, the candidate instructions are ignored by being overwritten or converted into register to register moves.

In another embodiment, both candidate instructions and non-candidate instructions are processed through the standard instruction processing flow including execution by the execution logic 320 as described above. The execution logic 320 executes candidate instructions to produce corresponding candidate instruction results which are stored along with the candidate instructions in the instruction buffer 410. After the execution logic 320 executes instructions, the retirement logic 322 controls the retirement of instructions.

Figure 6:
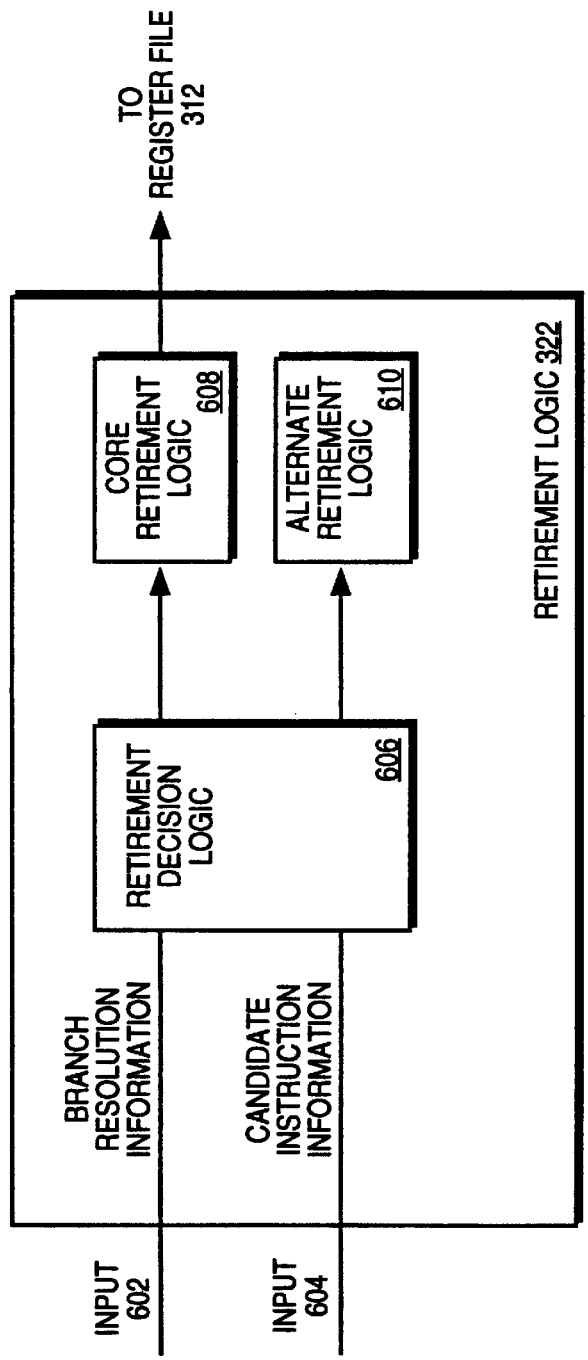
FIG. 6 is a block diagram of the retirement logic of one embodiment of the invention.

FIG. 6 shows a block diagram of one embodiment of the retirement logic 322 of the invention. The retirement logic 322 includes retirement decision logic 606 coupled to core retirement logic 608 and alternative retirement logic 610. The retirement logic 322 receives information from the execution logic 320 on input 602 indicating whether the conditional branch instruction of interest was resolved to be taken. In one embodiment, if the branch was resolved to be taken, a logical "1" is transmitted to the input 602. The information received at the input 604 indicates whether the instruction being processed is a candidate instruction or not as determined by information stored in the marker bit field 412 of the instruction buffer 410. In one embodiment, if the instruction is a candidate instruction, a logical "1" is received at the input 604.

The retirement decision logic 606 then determines whether or not to retire the instruction such that the result of executing it is committed to the processor architectural state. The retirement decision logic 606 makes this determination based on the information received at the inputs 602 and 604. In one embodiment, the retirement decision logic 606 operates such that, if the conditional branch instruction is resolved to be taken as indicated by information received at the input 602, and the instruction is marked as a candidate instruction as indicated by information received on input wire 604, then the alternative retirement logic 610 is activated such that the result of the instruction is not committed to architectural state. Otherwise, the core retirement logic 608 is activated.

The core retirement logic 608 retires an instruction such that the result of executing the instruction is committed to architectural state. In one embodiment of the invention, the core retirement logic 608 retires instructions in program order even if they are executed out-of-order.

In contrast, the alternative retirement logic 610 does not update the register file 312 (FIG. 3) with the result of the particular instruction being processed. In this way, results of speculatively executing the candidate instructions are not visible to the user or to the program and thus, do not adversely affect the processor state. In one embodiment, the instructions are converted to register to register moves such that the processor 201 effectively executes a "NOP" (no operation). In another embodiment, the retirement logic 322 re-writes the value in the register file 312 to the same value such that the register file 312 is not updated with the candidate instruction result. In yet another embodiment, the register file update is simply inhibited.

Thus, the retirement logic 322 only commits the results of executing the candidate instructions to architectural state if the branch was resolved to be not taken. If the branch was resolved to be taken, the results of executing the candidate instructions are not committed to architectural state and are invisible to the software program.

Thus, the invention provides for efficient execution of instructions in a program such that the misprediction penalty for particular types of program flow control instructions is eliminated. The invention accomplishes this without requiring a change to the instruction set architecture or recompilation of existing software code. The instruction buffer 410 for storing the candidate instructions pending resolution of the branch instruction takes up very little space in some embodiments, and thus can be utilized even where silicon space is at a premium. Further, the overall instruction processing flow remains the same such that instructions are fetched, decoded in some embodiments, executed and retired.

The Method of One Embodiment of the Invention

Figure 7:
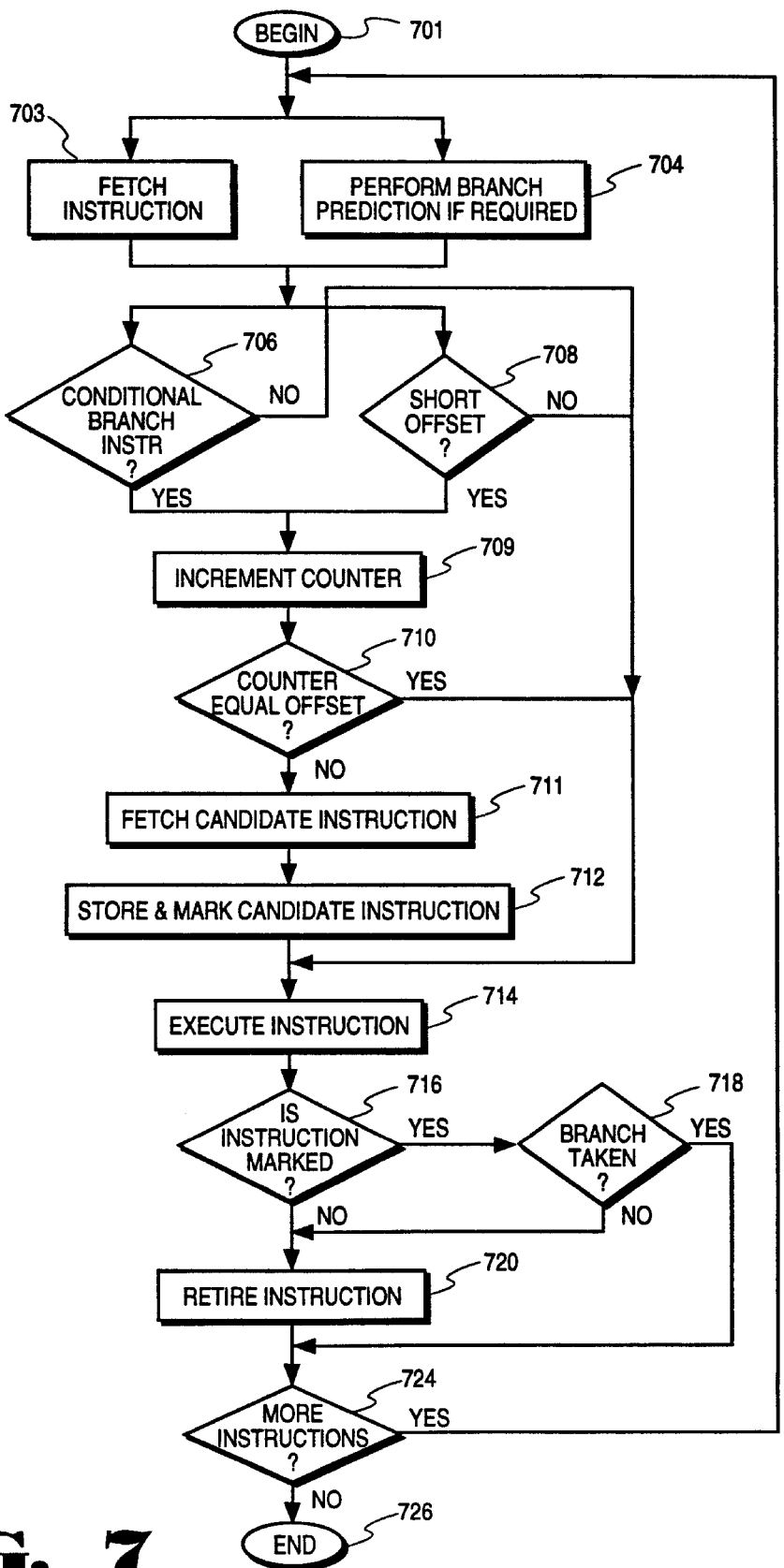
FIG. 7 illustrates the method of one embodiment of the invention.

FIG. 7 illustrates the method of one embodiment of the invention in more detail using a flow diagram. It will be understood that in a pipelined processor architecture, instructions are continuously being processed in all pipeline stages. Thus, processing of one instruction does not need to be completed before another instruction is fetched.

The method of one embodiment of the invention begins at step 701. In parallel, an instruction is fetched in step 703 and branch prediction is performed as required in step 704. In decision block 706, the instruction is evaluated to determine whether it is a conditional branch instruction. In decision block 708, the instruction is analyzed to determine whether the offset indicated by the program flow control instruction is less than a predetermined number. In one embodiment, the operations performed in decision block 706 and 708 are performed in parallel. In an alternate embodiment, the operation in decision block 708 is only performed if the operation in decision block 706 determines that the instruction being processed is a conditional branch instruction.

Referring back to decision block 706, if the instruction is determined not to be a conditional branch instruction, then the instruction is processed as normal at step 714. The same is true if the offset is determined not to be less than a predetermined number in decision block 708 and in some embodiments, if resources are not available to implement the optimization of the invention. If the instruction is evaluated and determined to be a conditional branch instruction in step 706 and also to have an offset less than the predetermined number in step 708, then in one embodiment, the optimization of the invention is implemented. In another embodiment, the optimization of the invention is only implemented if the branch instruction is identified as being difficult to predict.

If the optimization of the invention is implemented, then in step 709, a counter is incremented to keep track of the number of instructions fetched. In decision block 710, the counter is checked to see if it equals the offset of the target instruction as specified by the conditional branch instruction. If it does not, then in step 711, a candidate instruction following the program flow control instruction is fetched. In step 712, the candidate instruction is stored in a buffer and marked as a candidate instruction for subsequent processing. The method of the invention then returns to step 709 where the counter is incremented again. In decision block 710, if the counter is equal to the offset indicating that all candidate instructions have been fetched, execution proceeds at step 714.

In step 714, the method of the invention executes all instructions regardless of whether they are program flow control instructions, candidate instructions, or target instructions in one embodiment. In another embodiment, the candidate instructions are held in the buffer until the conditional branch instruction is resolved and only executed if the conditional branch instruction is resolved to be not taken. Other instructions which are not dependent on the conditional branch instruction resolution or execution of a candidate instruction proceed through the processing flow. If the conditional branch instruction is resolved to be not taken, the candidate instructions are ignored and not processed through the remainder of the instruction processing flow.

In decision block 716, in one embodiment where the candidate instructions are speculatively executed, instructions are evaluated to see if they are marked as a candidate instruction. If they are not marked, the instruction is retired and committed to architectural state in step 720. If the instruction is marked as a candidate instruction, the method of the invention moves to decision block 718 to determine whether the program flow control instruction above was resolved to be taken. If the program flow control instruction was resolved to be not taken, then in step 720, the candidate instruction is retired according to normal retirement procedures and the result of executing the candidate instruction is committed to architectural state. If the program flow control instruction above was resolved to be taken, the candidate instruction is not retired and the method of the invention moves on to decision block 724.

In decision block 724, if there are more instructions to be fetched, processing continues back at steps 703 and 704. Otherwise, the method of the invention ends at step 726.

Thus, the method of the invention provides for efficient processing of particular program flow control instructions, candidate instructions and target instructions without incurring a misprediction penalty and without changing the instruction set architecture.

We claim:

1. A processor for processing instructions in a program, the program including a conditional program flow control instruction specifying a target instruction, the program further including one or more candidate instructions, the processor comprising:
    a fetch unit to fetch instructions in the program;
    a buffer coupled to the fetch unit; and
    control logic to direct the fetch unit to fetch and store the one or more candidate instructions in the buffer prior to resolution of the conditional program flow control instruction if the program flow control instruction specifies a target instruction within a predetermined number of instructions from the conditional program flow control instruction.

2. The processor of claim 1 further including branch prediction logic coupled to the control unit, the branch prediction logic to predict a resolution of a condition associated with the conditional program flow control instruction.

3. The processor of claim 2 wherein the branch prediction logic further indicates whether the conditional program flow control instruction has been previously executed and wherein the control logic directs the one or more candidate instructions to be stored in the buffer if the branch prediction logic indicates that the conditional program flow control instruction has not been previously executed and the target instruction is within a predetermined number of instructions from the conditional program flow control instruction.

4. The processor of claim 2 wherein the branch prediction logic further stores information indicating a misprediction rate for the conditional program flow control instruction and wherein the control logic directs the one or more candidate instructions to be stored in the buffer pending resolution of the conditional program flow control instruction if the misprediction rate is greater than a predetermined misprediction rate and the target instruction is within a predetermined number of instructions from the conditional program flow control instruction.

5. The processor of claim 1 wherein the buffer includes a marker bit field to indicate whether an instruction stored in the buffer is a candidate instruction.

6. The processor of claim 5 further including a counter coupled to the control logic such that storage of the candidate instruction is controlled in response to the offset and the counter.

7. The processor of claim 1 further including
an execution unit coupled to the control logic, the execution unit to speculatively execute the one or more candidate instructions prior to resolution of the conditional program flow control instruction.

8. The processor of claim 7 wherein results of executing the candidate instructions are ignored by converting the candidate instructions into a register to register move instruction if a condition associated with the conditional program flow control instruction is resolved to be met.

9. The processor of claim 7 wherein results of executing the candidate instructions are ignored by rewriting a value stored in a register such that the value is not changed if the condition of the program flow control instruction is resolved to be met.

10. The processor of claim 1 wherein the program flow control instruction is a branch instruction.

11. The processor of claim 1 further including
an execution unit coupled to the control logic, the execution unit to execute the candidate instructions if a condition associated with the conditional program flow control instruction is resolved to be not met.

12. In a pipelined computer system, a method for executing instructions in a program flow comprising steps of:
identifying a conditional branch instruction associated with a target instruction offset from the conditional branch instruction by a predetermined number of instructions, the conditional branch instruction associated with a condition; and
fetching a candidate instruction in the program flow associated with the identified conditional branch instruction.

13. The method of claim 12 further including a step of speculatively executing the candidate instruction prior to resolution of the condition.

14. The method of claim 13 further including a step of ignoring a result of executing the candidate instruction if the conditional program flow control is resolved to be taken.

15. The method of claim 13 further including a step of converting the candidate instruction into a register to register move instruction if the condition is resolved to be met.

16. The method of claim 13 further including a step of rewriting a value stored in the register file such that the value is not changed if the condition is resolved to be met.

17. The method of claim 12 further including the steps of storing the candidate instruction in a buffer, and setting a bit in a marker bit field of the buffer to indicate that the instruction is a candidate instruction.

18. The method of claim 17 wherein the steps of fetching, storing and setting are repeated until a counter is incremented to equal the number of instructions by which the target instruction is offset from the conditional branch instruction.

19. The method of claim 12 wherein the target instruction is specified as an offset from the conditional branch instruction.

20. The method of claim 12 further including a step of predicting a resolution of the condition associated with the conditional branch instruction.

21. A processor for processing instructions in a program, the processor comprising:
means for fetching instructions in the program, the instructions including a conditional branch instruction indicating a target instruction and a condition that determines program flow, the instructions further including one or more candidate instructions; and
means for storing the one or more candidate instructions prior to resolution of the condition if the target instruction is within a predetermined number of instructions from the conditional branch instruction, the means for storing being coupled to the means for fetching.

22. The processor of claim 21 further including branch prediction logic coupled to the means for fetching to predict the resolution of the condition associated with the conditional branch instruction.

23. The processor of claim 22 wherein the branch prediction logic further indicates whether the conditional branch instruction has been previously executed and wherein the one or more candidate instructions are fetched and stored pending resolution of the condition associated with the conditional branch instruction if the branch prediction logic indicates that the conditional branch instruction has not been previously executed and the target instruction is within a predetermined number of instructions from the conditional branch instruction.

24. The processor of claim 22 wherein the branch prediction logic further stores information indicating a misprediction rate associated with the conditional branch instruction and wherein the one or more candidate instructions are fetched and stored if the misprediction rate is greater than a predetermined misprediction rate and the target instruction is within a predetermined number of instructions from the conditional branch instruction.

25. The processor of claim 21 further including
a means for executing instructions coupled to the means for fetching and the means for storing, the means for executing to execute the one or more candidate instructions if the condition is resolved to be not met.

26. The processor of claim 25 wherein results of executing the one or more candidate instructions are ignored by converting the candidate instruction into a register to register move instruction if the condition associated with the conditional branch instruction is resolved to be met.

27. The processor of claim 25 wherein results of executing the one or more candidate instructions are ignored by rewriting a value stored in a register such that the value is not changed if the condition of the conditional branch instruction is resolved to be met.

28. The processor of claim 21 wherein the means for storing includes a buffer including a marker bit field for indicating whether an instruction stored in the buffer is a candidate instruction, the processor of claim 15 further including a counter coupled to the means for storing for controlling storage of the one or more candidate instructions.

29. The processor of claim 28 wherein the target instruction is indicated by an offset from the conditional branch instruction such that the means for storing stores and marks the one or more candidate instructions until the counter is incremented to equal the offset.

30. A processor comprising:

comparator logic to identify a conditional program flow control instruction that indicates a target instruction within a predetermined number of instructions from the conditional program flow control instruction; and a fetch unit coupled to the comparator logic to fetch instructions in a program flow, the fetch unit being responsive to the comparator logic to fetch a candidate instruction associated with the identified conditional program flow control instruction prior to resolution of the conditional program flow control instruction.

31. The processor of claim 30 further including:

an instruction buffer coupled to the fetch unit to store instructions fetched by the fetch unit prior to execution; and execution logic coupled to the instruction buffer, the execution logic to speculatively execute the candidate instruction prior to resolution of the conditional program flow control instruction.

32. The processor of claim 31 further including retirement logic coupled to the execution logic, the retirement logic committing a result of executing the candidate instruction to architectural state if a condition associated with the conditional program flow control instruction is resolved to be not met.

33. The processor of claim 30 further including:

a branch prediction unit coupled to the fetch unit, wherein the fetch unit is further responsive to information included in the branch prediction unit to fetch the candidate instruction.

34. A computer system comprising:

a bus to communicate information;

a memory coupled to the bus, the memory to store instructions;

a processor coupled to the memory, the processor including comparator logic to identify a conditional program flow control instruction that indicates a target instruction within a predetermined number of instructions from the conditional program flow control instruction, and a fetch unit responsive to the comparator logic to fetch a candidate instruction associated with the identified conditional program flow control instruction prior to resolution of the conditional program flow control instruction.

35. The computer system of claim 34 wherein the processor further includes an execution unit coupled to the fetch unit, the execution unit to speculatively execute the candidate instruction prior to resolution of the conditional program flow control instruction.

36. The computer system of claim 35 wherein the processor further includes retirement logic coupled to the execution unit, the retirement logic committing a result of executing the candidate instruction to architectural state if a condition associated with the conditional program flow control instruction is resolved to be not met.

* * * * *